(12) United States Patent
Kolbe

(10) Patent No.: US 7,146,537 B2
(45) Date of Patent: Dec. 5, 2006

(54) PROTOCOL TEST DEVICE INCLUDING A NETWORK PROCESSOR

(75) Inventor: Andreas Kolbe, Berlin (DE)

(73) Assignee: Tektronix, Inc., Beaverton, OR (US)

( * ) Notice: Subject to any disclaimer, the term of this patent is extended or adjusted under 35 U.S.C. 154(b) by 550 days.

(21) Appl. No.: 10/291,026

(22) Filed: Nov. 7, 2002

(65) Prior Publication Data

US 2003/0093259 A1    May 15, 2003

(30) Foreign Application Priority Data

Nov. 12, 2001  (EP)  ................................. 01129524

(51) Int. Cl.
*G06F 11/00*  (2006.01)
(52) U.S. Cl. .............................. 714/28; 714/4; 714/25; 703/26; 709/230
(58) Field of Classification Search .................. 714/28; 703/26
See application file for complete search history.

(56) References Cited

U.S. PATENT DOCUMENTS

| | | | |
|---|---|---|---|
| 5,321,819 A * | 6/1994 | Szczepanek | 709/228 |
| 5,774,695 A * | 6/1998 | Autrey et al. | 703/26 |
| 5,864,658 A * | 1/1999 | Theobald | 714/25 |
| 5,897,609 A * | 4/1999 | Choi et al. | 702/122 |
| 2002/0112085 A1* | 8/2002 | Berg | 709/250 |
| 2003/0033406 A1* | 2/2003 | John et al. | 709/224 |

OTHER PUBLICATIONS

TEKTRONIX "K1103 Protocol Tester", Jan. 1999 Product Catalog.

Rohde & Schwarz "Protocol Tester PTW60 for Bluetooth™ Solutions", Sep. 2000 Product Catalog.

R. Dssouli et al "Test Development for Communication Protocols: Towards Automation", Computer Networks 1999, Elsevier Science Publishers B.V.

"Einkaufsfuhrer—Access Messtechnik—Universaltester fur den Service", 2001.

* cited by examiner

*Primary Examiner*—Robert Beausoliel
*Assistant Examiner*—Yolanda L. Wilson
(74) *Attorney, Agent, or Firm*—Francis I. Gray

(57) ABSTRACT

The present invention relates to a protocol test device including a network processor where the network processor has the following features:

protocol levels of a protocol stack can be programmed in it for at least one protocol per software;

it is capable of simultaneously processing input signals of different transmission formats, in particular of different clock rates;

a plurality of channel ports for network subscribers in parallel architecture; and one standardized interface for a control unit; with the network processor being designed for in-stream operation, i.e. signals arriving at the ports for network subscribers can be redirected to at least one other port for network subscribers, if necessary after a pre-processing step.

A host processor which has been programmed for performing protocol emulations and/or simulations is coupled to the network processor, with the signals of the network subscribers forwarded to the channel ports terminating in the protocol test device.

7 Claims, 3 Drawing Sheets

PROTOCOL TEST DEVICE INCLUDING A NETWORK PROCESSOR

BACKGROUND OF THE INVENTION

The present invention relates to a protocol test device including a network processor.

For the development of protocol test devices which are suitable for building up and operating so-called mobile networks of the third and fourth generation, two fundamental, aspects which partly contradict each other have to be considered:

(1) On the one hand, the complex simulation and emulation scenarios of the higher protocol levels in the fields of terrestrial radio access network and core network of such a network require a vast degree of flexibility and programmability in combination with a high storage capacity and high processor performance. A corresponding flexible and comfortable interface allowing a user to control these scenarios also has to be provided.

(2) On the other hand, however, when linking a protocol test device to the real physical transporting level in mobile networks, the following marginal conditions need to be adhered to:

(i) Several transport network interfaces with high and partly different data rates have to be supported, for example 155 mbit/s in the case of STM-1 and 622 mbit/s in the case of STM-4. In this case, a high number of asynchronous, dynamic links of the user level, which may include language signals and e-mail signals, for example, and of the control level, which may include relaying or switching data for controlling the user level, with complex cells- and/or package-based transport protocols have to be simultaneously included in an individual emulation/simulation scenario.

(ii) Additionally, high demands concerning the real-time behavior (quality of service, qos) of the individual links and the necessity of simulating load cases have to be considered. It has to be considered that the new mobile networks require and specify a clear separation of the control level, i.e. the signalizing/mobility protocol level, and the user level, i.e. the transporting protocol level, so as to allow a separate optimizing and further development of these two worlds. As a result, a fast further development and change in the technologies used, a fast use of new standards and a growth of the range are to be expected on the transporting protocol level.

At present, the former demands can only be met satisfactorily by using universal processors of the notorious Von-Neumann architecture. Such processors are available at low cost in the off-the-shelf components for various different system/bus concepts, e.g. PC, PCI, cPCI, VME. This type of processor, however, is designed for universal use in a mass market and does not exhibit the relevant performance-critical additional functions for the use in protocol-test devices, for example framing, timing/synchronizing, CRC, CAM. These processors only support standardized interfaces to external components and devices, e.g. a PCI/CPU bus, to memory components etc. Owing to the architecture of these universal processors, due to their high percentage of required memory space and processor performance for the protocol simulation/emulation of the higher protocol levels and the necessary interactions with a transporting network interface via a bus/memory interface, it is absolutely necessary in this case to reduce the effective data exchange to the absolute minimum of significant data.

When accomplishing the above aspects on the basis of such a universal processor, one is faced with the following problems:

It has to be possible to link one or plural physical interfaces with data rates of up to 155/622 mbit/s via the available standard interfaces of the universal processor, by means of a dedicated network interface hardware Besides the emulation of the transporting network protocols, this interface hardware must be capable of performing two tasks concerning the higher protocol-emulations/simulations performed on the universal processor: on the one hand, the reduction of the data stream from/to the universal processor by performing partial functions of the emulation/simulation of higher protocol levels, for example load simulation, pre-filtering and pre-working of packages concerning information from higher protocols; on the other hand, typical tasks of a protocol-test device, such as the exact generation of sending and receiving triggers, the conduction of error/performance statistics, etc.

In view of protocol standards of the transporting network protocol level which are partially still in the specification phase, ready adaptability of protocol-test devices is not only desired but also a crucial prerequisite to make it possible to react to changes in the standards without major delays and/or without major costs.

Moreover, the development and production of this network interface hardware should be possible at reasonable costs and quickly.

Two approaches for solving these problems are known in the prior art which both have various major shortcomings:

(1) A first approach relates to the use of one or plural standard hardware components of chip manufacturers from the network field such as specialized interface controllers, transceivers, ASSPs (application specific standard products). With their purpose of use in mind, these components have been designed and developed for a broad mass market with a high number of items and mostly for established transport network technologies. This results in the following relevant disadvantages which prevent a real solution of the above-mentioned problems:

The characteristics or hardware components required for the physical linking with newly developed transport network technologies (e.g. AAL2) only become available at such a late date that their use in protocol test devices is not acceptable since protocol test devices are predominantly required in the early phase of the development and the start of operation of new networks.

These standard hardware components are usually not freely programmable concerning their relevant logic, i.e. concerning firmware or microcode, and thus cannot or only partly realize specific demands in protocol test applications.

The available transfer functions of these components are mostly specialized in special fields of application, for example interworking, switching, voice/video, bulk transfers, with a high number of supported links and typical user-level data profiles; in this, the connection via a standard interface, e.g. a PCI bus, either only plays a minor role or creates a negative load of the overall performance in protocol test scenarios due to inter-processor communication and transmission of irrelevant data.

With reference to the example of a Motorola C 5 network processor, FIG. 1 illustrates the structure as well as fundamental components of such a network processor. The C 5 exhibits 16 ports 10*a* through 10*p* to the physical transport layer of network subscribers. Ports 10*a* through 10*p* constitute inputs to as well as outputs from the C 5. Each of the ports 10*a* through 10*p* has a topped channel processor 12*a* through 12*p*. Each of the channel processors 12*a* through 12*p* is bi-directionally connected to a ring bus 14, a payload bus 16 as well as a global bus 18. The channel processors 12*a* through 12*p* analyze input serial data streams from one or plural physical interfaces, perform corresponding search algorithms for incoming packages as well as, if necessary, later modifications or conversions and transmit the resulting data stream to one or plural output channel processors ("forwarding"). This way of functioning corresponds to a logical flat in-stream processing.

The C 5 is a single-chip system with high functional integration. This network processor exhibits 16 freely programmable multi-purpose CPUs as well as 5 co-processors with an aggregated entire processing performance of approx. 3,000 MIPS. Every 4 of said multi-purpose CPUs may be linked to form one cluster which will allow a flexible increase of the processing performance as well as of the amount of the protocol functions to be realized via aggregation of the instruction memories. The co-processors perform necessary typical tasks in network applications such as queuing, buffer service and complex search algorithms. All processors within the C 5 are linked via said three high-speed bus systems and have a total bandwidth of approx. 16 gbps.

In view of the purpose of use of such a network processor 8, various components, amongst others the co-processors, are likewise linked to one or plural of the buses. A buffer management unit 20 as well as a queue management unit 22 are linked to global bus 18 and payload bus 16. A fabric processor 24 which is connected to topped processing units 25, as well as an executive processor 26 are linked to the ring bus 14, the payload bus 16 as well as the global bus 18. A table-lookup unit 28 is linked to the ring bus 14.

FIG. 2 shows the general way of functioning and the typical area of use of a network processor 8. This network processor 8 is linked to physical transport layers 30*a* through 30*p* of network subscribers via its ports 10*a* through 10*p*. If necessary, an interface circuit may be inserted. Of course, it is also possible to link only part of said ports 10*a* through 10*p* to network subscribers. A control unit 32, which is connected to said network processor 8 via a standardized interface 34, for example a PCI bus, allows a user to configure the network processor 8 with respect to its tasks, which typically include the following: switching, routing, package classification, quality of service applications, package modifications, bandwidth aggregation, interworking applications, cell-, package conversion, data framing, data formatting, billing and remote monitoring. One aspect common to all fields of use is that the network processor 8 operates in-stream, i.e. as a switching center within a network. This is illustrated in FIG. 2 in that the network processor 8, as indicated by arrow 36, switches signals between port 10*a* and port 10*p*. However, it may also be envisaged, as illustrated by arrows 38*a* and 38*b*, to forward the data streams to a topped switching center 42 via a non-standardized interface 40, which switching center 42 then in turn performs switching tasks, as indicated by arrows 44*a* through 44*d*. The intended area of use of network processors is thus switchboard and interworking units within one network.

(2) A second approach provides for the realization of transport interface hardware by the use of FPGAs (field programmable gate arrays) and/or ASICs (application specific integrated circuits) which creates a solution that is adapted to the above demands, in particular an acceptable compromise between the programmability of a software-based design and a performance-optimized processing via functions which are realized in hardware form. The disadvantages of such a solution, however, are its high costs and the long development phase, combined with the prerequisite of a consolidation concerning the transporting network protocols which are to be supported.

Consequently, neither prior art approach presents an acceptable solution for the above mentioned problems. Therefore it is the object of the present invention to provide a protocol test device which allows inexpensive testing of mobile networks of the third and fourth generation.

BRIEF SUMMARY OF THE INVENTION

The invention is based on the idea that if the hardware components provided in network processors that were actually designed for a totally different application are skillfully used in a way which is possible, even if not intended thus by the manufacturer, if necessary also by suitable programming, such network processors are suitable for accomplishing the above-specified objects. A network processor is suitable for use in a protocol test device according to the invention if it has at least the following features:
   protocol levels of a protocol stack can be programmed in it for at least one protocol per software;
   it is capable of simultaneously processing input signals of different transmission formats, in particular of different clock rates;
   a plurality of channel interfaces for network subscribers in parallel architecture;
   at least one interface for a topped processing unit;
   one standardized interface for a control unit.

The invention is especially based on the idea of no longer using a network processor as an intelligent in-stream processor between data input and data output, but to connect the data streams with a protocol emulation/simulation environment which is based on a universal host, so that the data streams terminate in the protocol test device. This creates one or plural terminating network interfaces with emulation/simulation properties on any protocol level(s). This not only allows the abovementioned objects of the invention to be accomplished satisfactorily, but also creates various additional advantages:
   Typical demands on protocol test devices like triggers, error and performance metrics can be realized more easily with the suggested solution even in the complex mobile networks of the third and fourth generation without dedicated and costly hardware support.
   Completely novel possibilities concerning the realization of protocol test applications with different kinds of transport network protocols on different physical interfaces due to a simple installation of the corresponding software which allows flexible and quick adapting to changes in the protocol standards without changing the hardware.
   The special functions available in the network processor anyway no longer have to be performed by the host, thus allowing the memory and processing capacities of the host to be used for other purposes.

In particular, all performance-relevant or performance-influencing and real-time protocol emulations or parts of them can be transferred into the software running in the network processor.

In a preferred embodiment, the network processor has at least one channel processor topping the channel ports for network subscribers, in particular each channel port for a network subscriber, with only part of the channel ports being connected to network subscribers of a physical network, and the channel processors of the non-connected ports, in particular after they have been grouped into clusters, being at least partially interlinked in the form of an ascending hierarchy so as to simulate or emulate a protocol stack. This unusual use of actually parallel channel processors in a serial manner, in which some ports have to remain non-connected in order to provide the channel processors thus becoming available for such a hierarchical structure, allows at least a partial shifting of the simulation/emulation of a protocol stack from the host into the network processor. A protocol stack thus built up in the network processor thus allows the performance of emulations of protocol layers or parts thereof, which—in a conventional protocol test device and with the present solution approaches—could have been realized only in a host and/or by means of topped dedicated hardware components. The data stream in this changed array always flows between one or plural physical ports and the host CPU. In a preferred embodiment, the host processor is coupled to the network processor via the standardized port for a control unit, i.e. the standard interface originally only intended for configuration purposes, usually a PCI bus interface, is used as a data interface from and to higher layer protocol emulations and simulations in a universal host processor environment. The data stream between the physical ports and the host CPU, as mentioned above, thus preferably takes place via the standardized interface and thus not by using the interface originally intended for this purpose, such as in the Motorola C 5 network processor. Preferably, the network processor has a plurality of generally programmable processors. In a particularly suitable variant of a network processor, the channel processors can be freely programmed. This allows use of the channel processors for shifting functions that were performed by the host in the prior art to the network processor. This is furthermore supported by the network processor having a plurality of co-processors which are designed for network applications, in particular queuing, buffer service and search algorithms. The load on the host may be further reduced by programming the network processor such that it performs pre-filtering of the incoming signals at the channel ports.

Further advantageous embodiments of the invention can be gathered from the subclaims.

BRIEF DESCRIPTION OF THE SEVERAL VIEWS OF THE DRAWING

In the following, an embodiment of the invention is described with reference to the attached drawings, of which

DETAILED DESCRIPTION OF THE INVENTION

Figure 1:
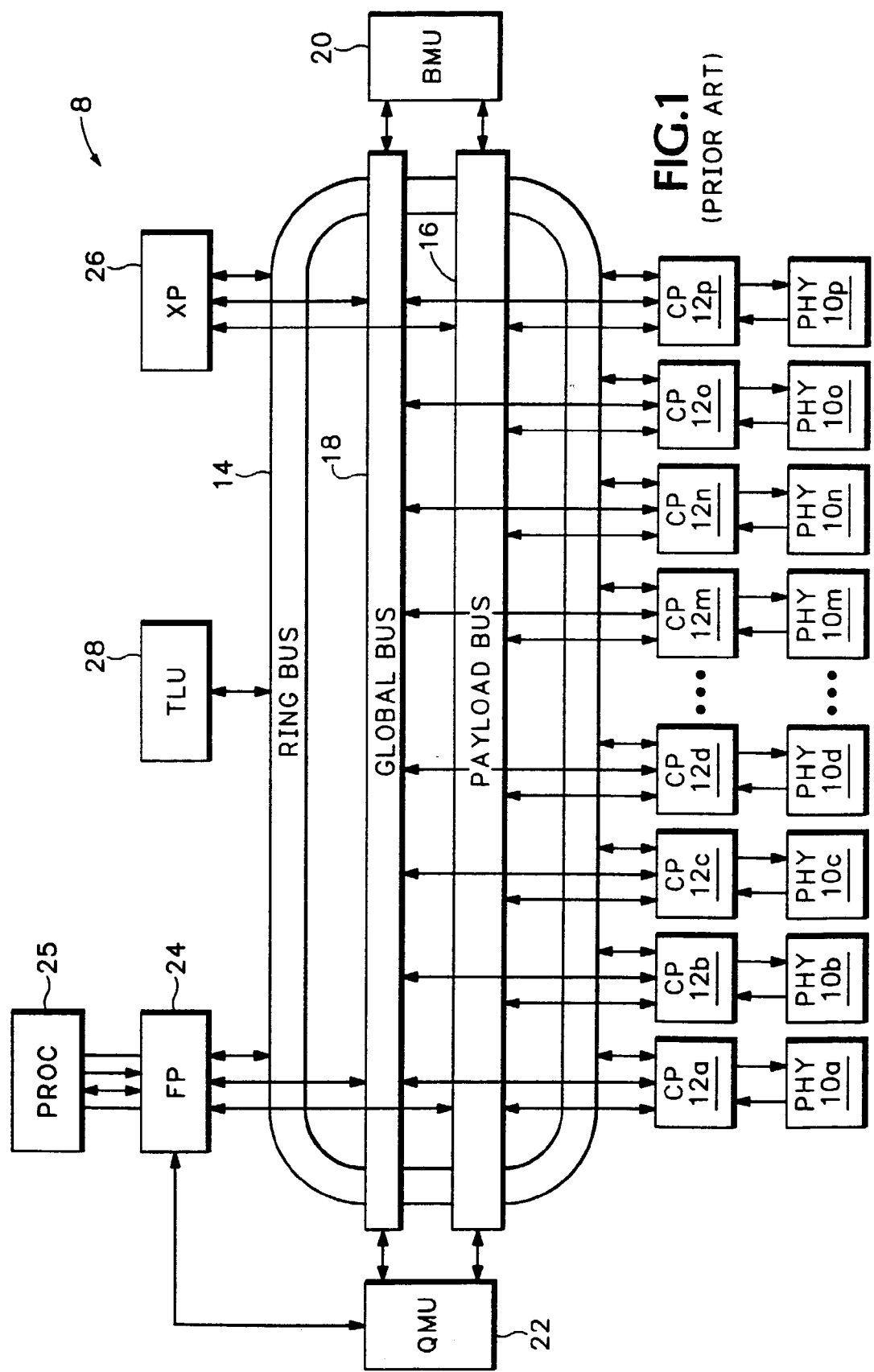
FIG. 1 is a principal view of the structure of a prior art network processor suitable for use in a protocol test device according to the invention.
Figure 2:
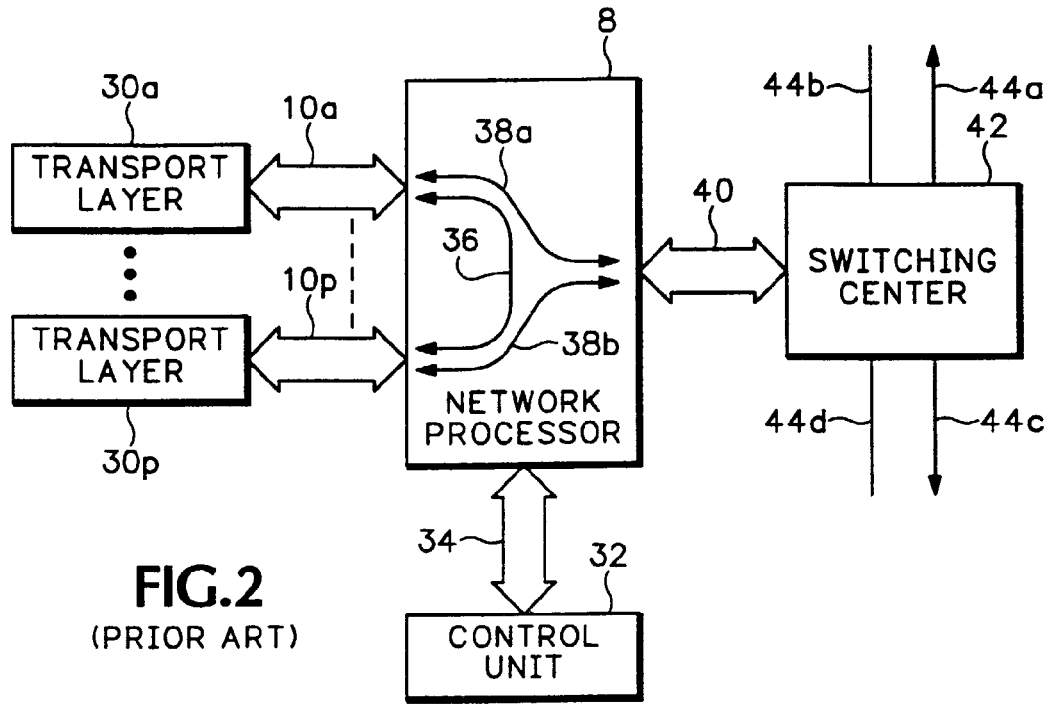
FIG. 2 is a schematic view of a network processor in a typical prior art use environment.
Figure 3:
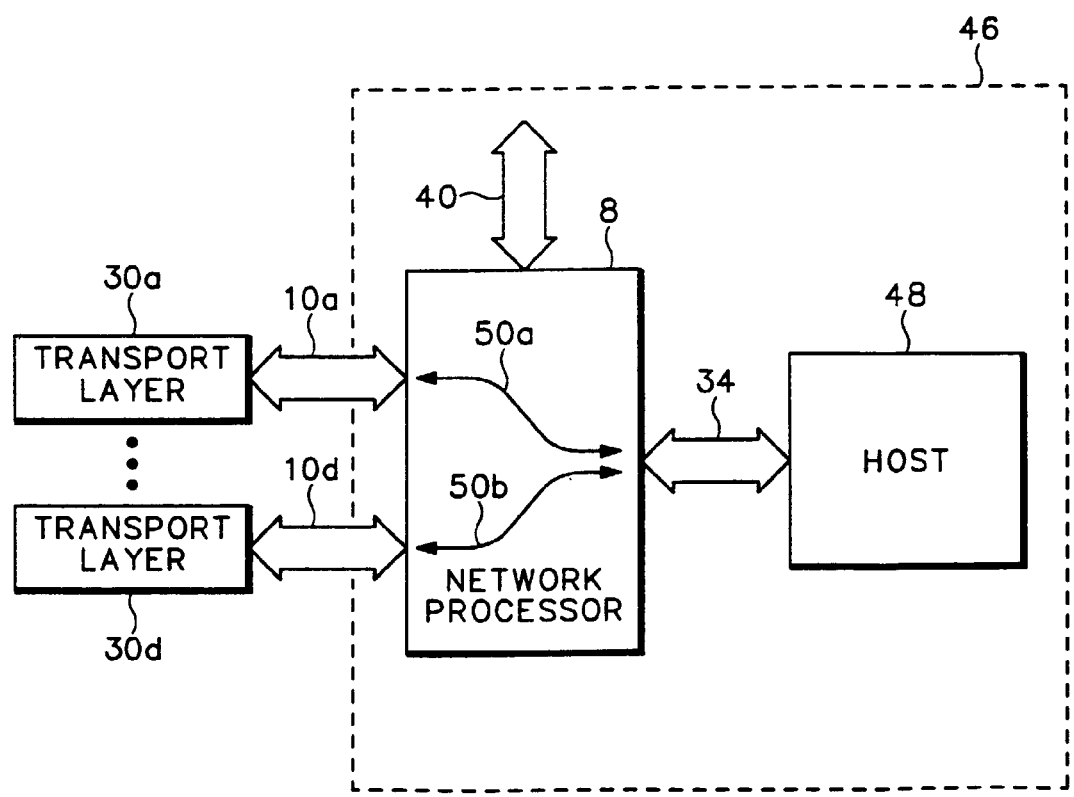
FIG. 3 is a schematic view of a protocol test device according to the invention including a network processor and a host.

FIG. 3 shows a protocol test device 46 of the invention including a network processor 8 as well as a host (processor) 48 which are interconnected via a standard interface 34 of the network processor 8. In the illustrated embodiment, the network processor 8 has its four ports 10a through 10d connected to physical transport layers 30a through 30d of network subscribers. As indicated by arrows 50a, 50b, the signals received by the physical transport layers 30a through 30d are not transferred to a different one of the ports intended for network subscribers, but instead are forwarded to the host 48. Vice versa, signals for simulating/emulating test are generated in the host 48, then transmitted to the network processor 8 via interface 34 and from there forwarded to the intended physical transport layers 30a to 30d via ports 10a through 10d. The network processor 8 and host 48 communicate with each other via the interface 34 which had originally been intended for the configuration of the network processor 8, but not for the data transfer now taking place through it. By contrast, the interface 40 originally intended for the data transfer remains unused.

Figure 4:
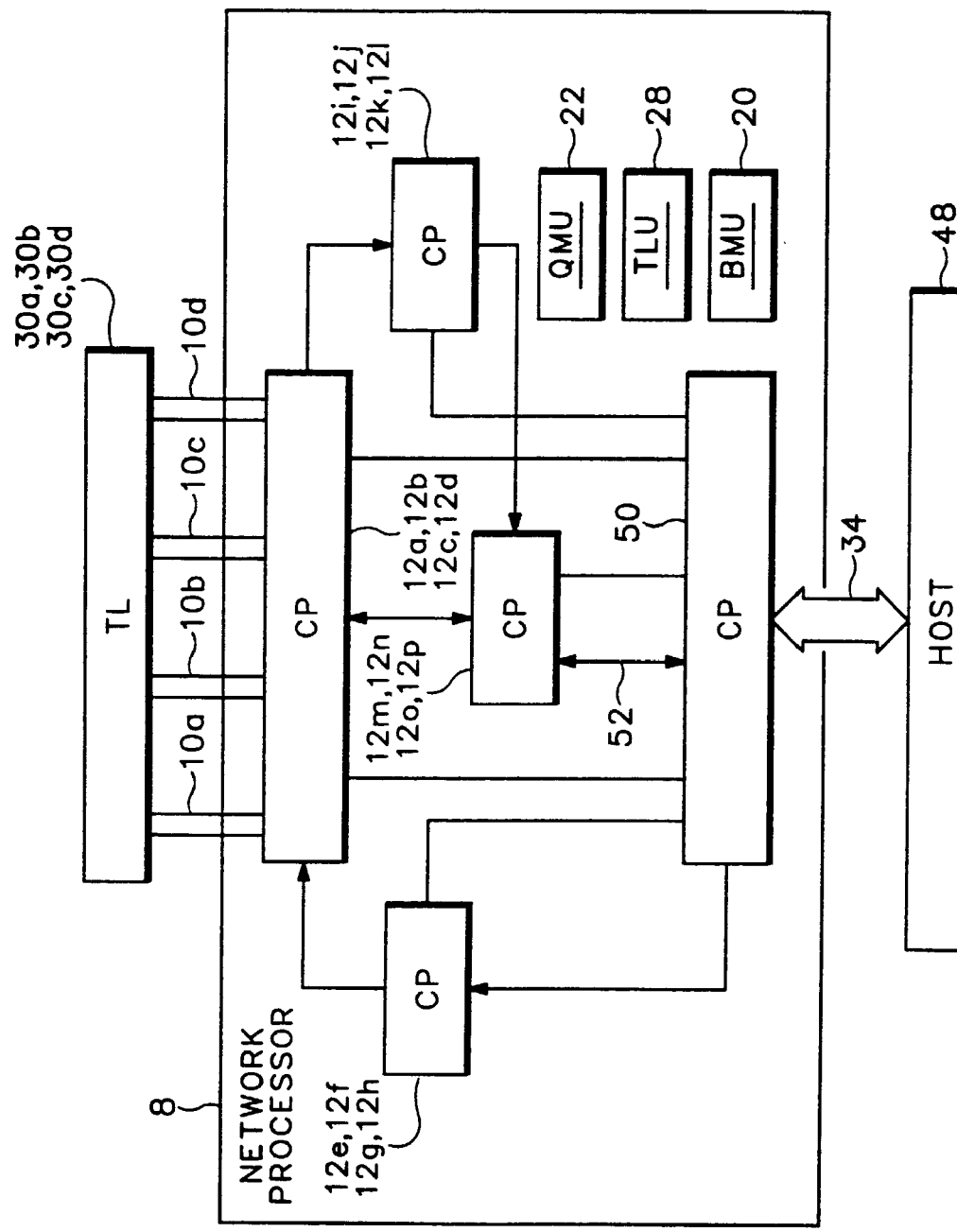
FIG. 4 is a detailed view of the course of selected signals in a network processor of an embodiment of the protocol test device according to the invention.

FIG. 4 shows the course of data signals in bold lines whereas the thin lines indicate links for exchanging control signals. The four ports 10a through 10d of the network processor 8 have their inputs connected to four physical transport layers 30a through 30d. Incoming signals first pass the channel processors 12a through 12d interconnected to form a first cluster. The output signal of the first cluster is forwarded to a second cluster formed by the channel processors 12i to 12l whose output signal in turn is guided to a third cluster formed by the channel processors 12m through 12p. Via a link 52, the third cluster is connected to a co-processor 50 which coordinates the data transfer to the host 48. The co-processor 50 directs the signals coming from the host 48 to a fourth cluster which is formed by the channel processors 12e through 12h and which communicates with the first cluster. From there, the signals are forwarded to the physical transport layers 30a through 30d via ports 10a through 10d.

In an embodiment of the protocol test device of the invention, the physical transport layers are of the STM-1/STS-3c format. The first cluster relates to ATM (SDH/Sonet+, ATM Tx/Rx). The second cluster relates to AAL2 Tx (AAL2 CPS I.363.2, AAL2 SSSAR I.366.1), the third cluster to AAL2 Rx (AAL2 CPS I.363.2), whereas the fourth cluster relates to SAR (AAL5 Tx/Rx I.363.5, AAL2 SSSAR Rx I.366.1). The host processor is realized by a PowerPC 750.

The present invention thus only uses one cluster made up of four channel processors for the direct communication with up to four STM-1 ATM networks, for any UTRAN protocol interfaces (Iu, Iub, Iur). The remaining clusters are grouped and interlinked in a way that they perform, one after another, the framing or formatting functions, i.e. segmentation and reassembling, and the link-related protocol state machines (in the present case AAL5, AAL2/FP) for the next higher protocol level in the protocol stack. The following protocol emulations/simulations are supported by this software:

ATM via STM-1/STS-3c (I.432.1/I.432.2)

AAL 5 (I.363.5)

AAL 2 (I.363.2, I.366.1, SSSAR, SSTED) in combination with the UMTS frame protocols (3GPP TS 25.435, TS25.427)

ATM cells shaping and scheduling (I.371, ATM-F TM 4.x) AAL 2 CPS package shaping.

In an embodiment of the protocol test device of the invention, the following functions of protocol test applications which could only be realized with the aid of the host processor up to now, or which were not possible at all due to excessive performance demands, are now performed by the network processor:

Intelligent pre-filtering concerning contents and information elements of protocols from higher protocol levels—even via several logical links Synchronizing of the data streams for higher protocol levels Automatic, standardized protocol reactions in performance-critical phases Performance of load tests by generation of load profiles Realization of complex carrier mechanisms Internal intermediate storage of large amounts of already pre-filtered protocol data units for a later offline editing or controlling of load peaks in asynchronous networks; and Correct sending and receiving trigger methods for all protocol data blocks corresponding to their real transport in asynchronous cells- or package-oriented networks.

What is claimed is:

1. A protocol test device comprising:
a) a network processor having the following features;
protocol levels of a protocol stack can be programmed for a protocol per software;
capability of simultaneously processing input signals of different transmission formats;
a plurality of channel ports for network subscribers in parallel architecture;
a standardized interface for a control unit, the network processor being designed for in-stream operation; and
b) a host processor which has been programmed for performing protocol emulations and/or simulations coupled to the network processor via the standardized interface, with signals of the network subscribers forwarded to the channel ports terminating in the protocol test device;
wherein the channel ports for the network subscribers, in particular each channel port for a particular network subscriber, has a topped channel processor, with only part of the channel ports being connected to the network subscribers of a physical network, and the channel processors of the channel ports which have remained non-connected being grouped together as clusters and being at least partially interlinked in the form of an ascending hierarchy in order to simulate or emulate a protocol stack.

2. The protocol test device as claimed in claim 1 wherein the standardized interface is a PCI interface.

3. The protocol test device as claimed in claim 1 wherein the network processor comprises a plurality of generally programmable processors.

4. The protocol test device as claimed in claim 1 wherein the channel processors are freely programmable.

5. The protocol test device as claimed in claim 1 wherein the network processor comprises a plurality of co-processors which are designed for network applications selected from the group consisting of queuing, buffer service and search algorithms.

6. The protocol test device as claimed in claim 1 wherein the network processor has been programmed to perform pre-filtering of the signals forwarded via the channel ports.

7. The protocol test device as claimed in claim 2 wherein the network processor comprises a Motorola C 5 network processor.

* * * * *